United States Patent [19]
Lee

[11] Patent Number: 5,279,428
[45] Date of Patent: Jan. 18, 1994

[54] ELECTRIC LIGHT STRING HOLDER

[76] Inventor: Kuo-Hsing Lee, 10139 Duchamp, Houston, Tex. 77036

[21] Appl. No.: 985,317

[22] Filed: Dec. 4, 1992

[51] Int. Cl.⁵ ............................................. A47F 7/00
[52] U.S. Cl. ........................................ 211/13; 211/71
[58] Field of Search ......................... 211/13, 71, 74, 26

[56] References Cited

U.S. PATENT DOCUMENTS

| | | | |
|---|---|---|---|
| 809,422 | 1/1906 | Bowmaster | 211/13 |
| 2,595,929 | 5/1952 | Dartt | 211/13 X |
| 2,821,307 | 1/1958 | Linsley | 211/13 |
| 3,462,020 | 8/1969 | Hall | 211/13 |
| 3,906,146 | 9/1975 | Taylor | 211/13 X |
| 4,871,074 | 10/1989 | Bryson et al. | 211/13 |
| 5,139,208 | 8/1992 | Schooley | 211/13 X |

*Primary Examiner*—Alvin C. Chin-Shue
*Assistant Examiner*—Sarah A. Lechok
*Attorney, Agent, or Firm*—Bill B. Berryhill

[57] ABSTRACT

A holder for a string of electric lights of the type having a plurality of lamps and corresponding lamp sockets connected at spaced intervals to electrical wiring. The holder is made up of connected upper and lower relatively thin elongated mounting plates along the sides of which are provided uniformly spaced alternating tabs and open ended slots. The upper and lower mounting plates and slots are aligned. Each one of the lower slots is for receiving wiring emanating from the base of a corresponding one of the lamp sockets and each one of the upper slots is for receiving a corresponding one of the lamps, the corresponding lamp sockets then being confined therebetween the upper and lower mounting plates. Two or more of the holders may be connected side by side.

14 Claims, 2 Drawing Sheets

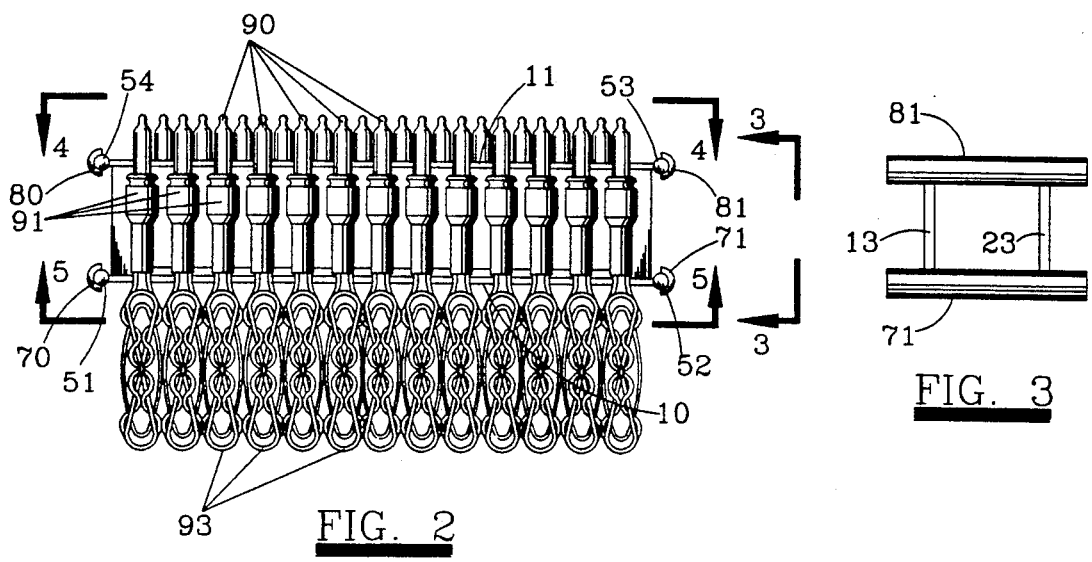
FIG. 2
FIG. 3
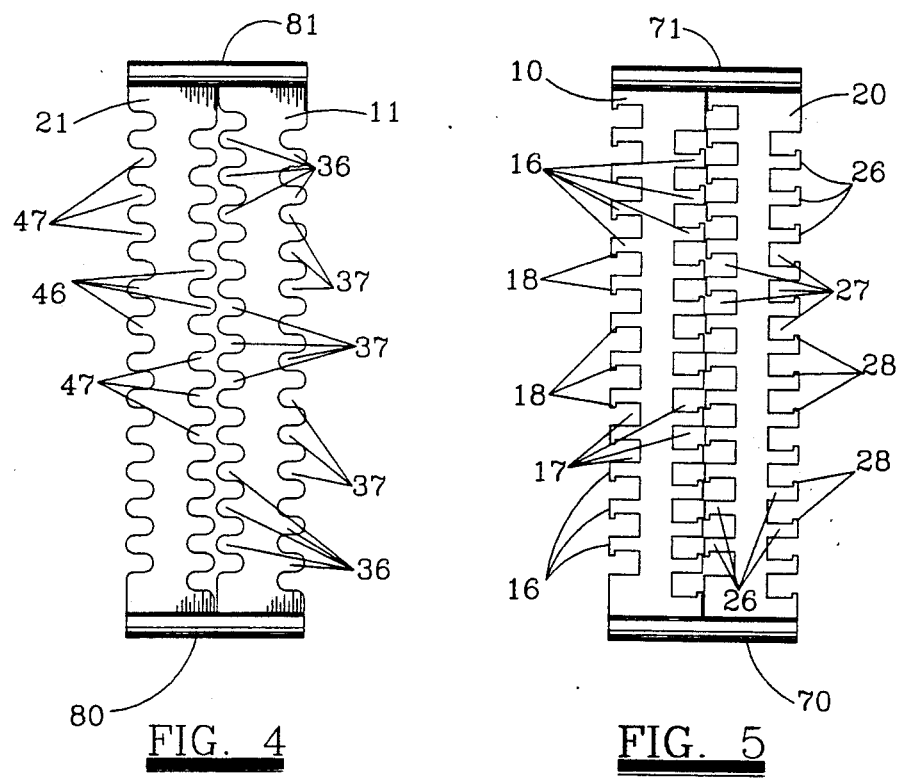
FIG. 4
FIG. 5

ELECTRIC LIGHT STRING HOLDER

BACKGROUND OF THE INVENTION

1. Field of the Invention

The present invention pertains to holders for storing and/or displaying electric lights. More specifically, the present invention pertains to holders for storing and/or displaying strings of electric lights such as those used for Christmas decorations.

2. Brief Description of the Prior Art

Various kinds of electric lights are manufactured which include a plurality of lamps and corresponding lamp sockets connected at spaced intervals to electric wiring. The lamps may be connected in series of parallel. Typical of such lights are the kind sold for Christmas or other festive occasions which allow a multiplicity of lights to be strung around a Christmas tree or other object as decoration.

Some type of holder or container is usually provided to display and/or store strings of electric lights. If not, the wire and lamps may become entangled and if an attempt is made to untangle them there may be damage to the wiring, the lamps or the sockets in which the lamps are placed, rendering the light string useless. For this reason, strings of electric lights are typically placed on a cardboard or plastic holder in some organized fashion and placed in a box. The box may be provided with a window or opening so that the purchaser or user may see the type of lights he is purchasing or using without having to remove the lights therefrom. Such boxes are relatively bulky, easily damaged and not easy to reuse. Since these boxes are relatively bulky, they may require more storage and display space than necessary.

With the increased popularity of electric lights, particularly those having miniature lamps, improved packaging and storage is being sought. Holders for electric light strings should be compact, easy to store, rugged yet with good sales appearance. In addition, light string holders which are easy to use and reuse are needed.

SUMMARY OF THE PRESENT INVENTION

The present invention provides a holder for a string of electric lights of the type having a plurality of lamps and corresponding lamp sockets connected at spaced intervals to electrical wiring. The holder includes upper and lower connected relatively thin elongated mounting plates along the sides of which are provided uniformly spaced alternating tabs and open-ended slots. The upper and lower mounting plates are fixed together so that the upper and lower slots are correspondingly aligned, each one of the lower slots for receiving wiring emanating from the base of a corresponding one of the lamp sockets and each one of the upper slots for receiving a corresponding one of lamps nearest its junction with a corresponding one of the lamp sockets. When so received, the corresponding lamp sockets are confined between the upper and lower mounting plates.

In a preferred embodiment, the tabs and slots of the lower mounting plate are rectangularly shaped and the tabs and slots of the upper mounting plate are rounded in shape to correspond with the cross section of the lamps. In the preferred embodiment, the opening into the ends of the lower rectangular slots is less than the width of the slots and the opening into the ends of the upper rounded slots is less than the diameter of the lamps. These reduced openings assist in maintaining the corresponding lamps and wiring therein.

In preferred embodiments, the holder also includes connector elements by which two or more of the holders may be connected side by side. In these embodiments, corresponding cylindrical and tubular members are provided for transverse disposition at opposite ends of the upper and lower mounting plates. One of the cylindrical and tubular members is affixed to the plates, the other of a cylindrical and tubular member being mutually engageable therewith.

The holder of the present invention is particularly suitable for storing and displaying light strings having a large number of small or miniature lamps. It is designed for easy removal of the light string and easy and efficient return of the light string to the holder after use for permanent storage. The holder is conveniently designed for slipping in and out of a small rectangular box. It is also conveniently designed for use with light strings of a predetermined number of lamps and, in side by side usage, for multiples of predetermined number of lamps. Many other objects and advantages of the invention will be apparent from reading the description which follows in conjunction with the accompanying drawings.

BRIEF DESCRIPTION OF THE DRAWINGS

FIG. 2 is a side view of the light string holders of FIG. 1, showing a string of lights, with lamps, corresponding lamp sockets and associated electrical wiring, attached thereto for display and/or storage, according to a preferred embodiment thereof;

FIG. 3 is an end view of the holders of FIGS. 1 and 2, as viewed along lines 3—3 of FIG. 2;

FIG. 4 is a top plan view of the holders of FIGS. 1, 2 and 3, as taken along lines 4—4 of FIG. 2; and FIG. 5 is a bottom plan view of the holders of FIGS. 1, 2 and 3, as viewed along lines 5—5 of FIG. 2.

DESCRIPTION OF A PREFERRED EMBODIMENT

Figure 1:
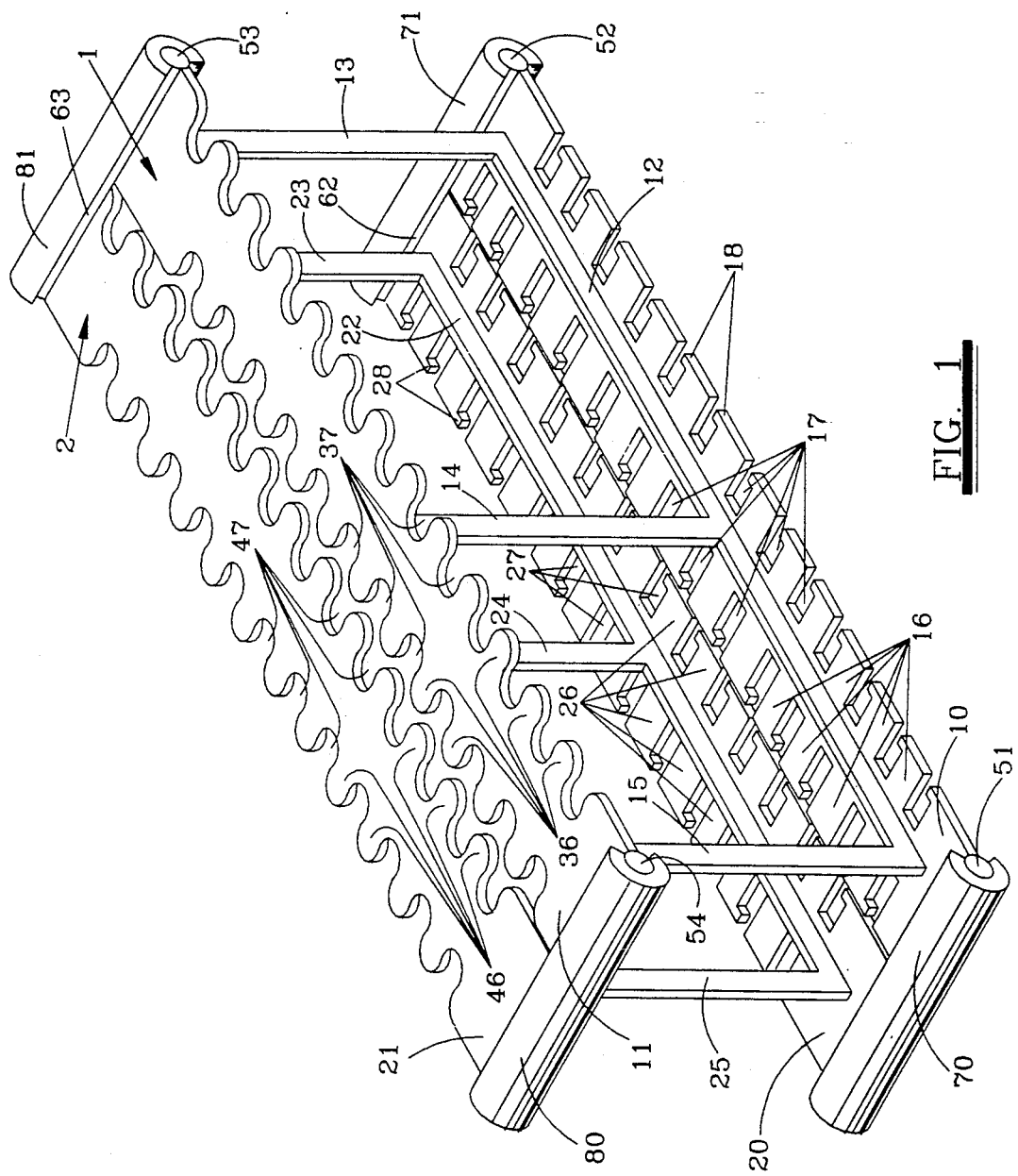
FIG. 1 is a perspective view of a pair of holders for holding a string of electric lights, according to a preferred embodiment of the invention.

Referring first to FIG. 1 there is shown two holders, 1 and 2, for holding a string of electrical lights of the type which includes a plurality of lamps and corresponding lamp sockets connected at spaced intervals to electrical wiring. The holders 1,2 are essentially identical and can be used alone, in pairs or with additional such holders. In describing the holder, all of the drawings illustrate two of such holders, 1,2, connected in pairs.

Each of the holders 1,2 include a relatively thin elongated lower mounting plate 10,20 and a relatively thin elongated upper mounting plate 11,21, connected by corresponding support members 12-15 and 22-25, respectively. Each side of the lower mounting plates 10,20 is provided with uniformly spaced alternating lower tabs 16, 26, and open-ended slots 17, 27, respectively. In the preferred embodiment, the tabs 16,26 and slots 17,27 are rectangularly shaped. However, a transverse extension 18,28 from these tabs 16,26 creates a reduced opening into the slots 17,27 of a width less than the width of the slots 17,27. Also see FIG. 5.

The relatively thin elongated upper mounting plates 11,21 are provided, along each side thereof, with uniformly spaced alternating upper tabs 36,46 and slots 37,47. The upper tabs 36,46 and slots 37,47 are, in a preferred embodiment, substantially rounded so that the slots 37,47 closely conform to the outside diameter of corresponding lamps to be received therein. Since the tabs 36,46 are also rounded, the openings into the ends of the slots 37,47 are of a width slightly less than the outside diameter of the corresponding lamps to be received therein. Also see FIG. 4.

It should be noted that the slots 17,27 along each side of the lower mounting plates 10,20 are transversely opposed to the tabs 16,26 along the opposite side of the lower mounting plates 10,20. Likewise, the slots 37,47 along each side of the upper mounting plates 11,21 are transversely opposed to the tabs 36,46 along the opposite side of the upper mounting plates 11,21. Thus it can be seen that when two holders 1,2 are in side-by-side relationship, the upper and lower tabs, 36,16 and 46,26 block the openings into the upper and lower slots 37,47 and 17,27, respectively, of each other.

As previously mentioned, the drawings illustrate two holders 1,2 connected in side-by-side relationship. This is accomplished by connector means which in the preferred embodiment, includes cylindrical connector members 51,52,53,54,61,63,64 at opposite ends of the upper and lower mounting plates 10,11,20,21. Corresponding tubular connector members 70,71,80,81 are provided which are slidingly and coaxially engageable with corresponding ones of the cylindrical connector members 51,52,53,54,61,62,63,64 aligned end-to-end when two or more holders such as the holders 1,2 are side-by-side.

As best seen in FIG. 2, a string of electrical lights is shown being held by the holders 1,2. The string of electrical lights includes a plurality of lamps 90 and corresponding lamp sockets 91 connected at spaced intervals to electrical wiring 93. The wiring emanating from the base of the lamp sockets 91 is received by corresponding slots, such as the slots 17 and 27. The lamps 90 are received, near their junction with corresponding ones of the lamp socket 91, within the upper slots 37, 47. If two holders 1,2 are to be attached, the lamps and lamp sockets are placed on each one of the holders 1,2 before they are connected. As so mounted, it will be seen that the lamp sockets 91 are confined between the upper and lower mounting plates 11,10 and 21,20 of the holder 1,2. In these positions, as best illustrated in FIG. 2, the holders and electrical lights strings attached thereto are very compact and can be conveniently stored and placed in a rectangular box sized therefore.

A single preferred embodiment of the light holder, according to the present invention has been described herein. It has been described in a combination where two of such holders are connected together. However, it is understood that these holders may be used singularly or connected in series of two or more. Many variations of the invention can be made without departing from the spirit of the invention. Accordingly, it is intended that the scope of the invention be limited only by the claims which follow.

I claim:

1. A holder for a string of electric lights which includes a plurality of lamps and corresponding lamp sockets connected at spaced intervals to electrical wiring, said holder comprising:

a relatively thin elongated lower mounting plate along each side of which is provided uniformly spaced alternating lower tabs and open ended slots;

a relatively thin elongated upper mounting plate along each side of which is provided uniformly spaced alternating upper tabs and open ended slots; and support means by which said upper and lower mounting plates are fixed together so that said upper and lower slots are correspondingly aligned, each one of said lower slots for receiving wiring emanating from the base of a corresponding one of said lamp sockets, each one of said upper slots for receiving a corresponding one of said lamps near its junction with said corresponding one of said lamp sockets, and confining said corresponding lamp sockets between said upper and lower mounting plates.

2. A holder for a string of electric lights as set forth in claim 1 in which said lower slots are substantially rectangular in shape.

3. A holder for a string of electric lights as set forth in claim 2 in which the opening into the ends of said lower slots are of a width less than the width of said lower slots to assist in maintaining said wiring therein.

4. A holder for a string of electric lights as set forth in claim 1 in which said upper slots are substantially rounded to closely conform to the outside diameter of said corresponding lamps received therein.

5. A holder for a string of electric lights as set forth in claim 4 in which the opening into the ends of said upper slots are of a width slightly less than the outside diameter of said corresponding lamps received therein.

6. A holder for a string of electric lights as set forth in claim 1 in which the slots along each side of said upper and lower mounting plates are transversely opposed with the tabs along the opposite side of said upper and lower mounting plates.

7. A holder for a string of electric lights as set forth in claim 1 including connector means by which two or more of said holders may be connected side by side.

8. A holder for a string of electric lights as set forth in claim 2 in which said connector means comprises transversely disposed cylindrical connector members at opposite end of said upper and lower mounting plates and corresponding tubular connector members slidingly and coaxially engageable with corresponding ones of said cylindrical connector members aligned end-to-end when said one or more holders are side-by-side.

9. A holder for a string of electric lights as set forth in claim 8 in which a longitudinal slot is cut through the wall of said tubular connector members to permit said sliding engagement with said cylindrical connector members without being interferred with by said mounting plates.

10. A holder for a string of electric lights which includes a plurality of lamps and corresponding lamp sockets connected at spaced intervals to electric wiring, said holder comprising:

a relatively thin elongated lower mouting plate along each side of which is provided uniformly spaced alternating substantially rectangularly shaped tabs and outwardly opening slots;

a relatively thin elongated upper mouting plate along each side of which is provided uniformly spaced alternating substantially rounded tabs and outwardly opening rounded slots;

support means by which said upper and lower mounting plates are fixed together so that said upper rounded slots are correspondingly aligned with said lower rectangular slots, each of said lower rectangular slots for receiving wiring emanating from the base of a corresponding one of said lamp sockets, each one of said rounded upper slots for receiving a corresponding one of said lamps, and confining said corresponding lamp sockets between said upper and lower mounting plates.

11. A holder for a string of electric lights as set forth in claim 10 in which the opening into the ends of said lower rectangular slots is less than the width of said slots and the opening into the ends of said upper rounded slots is less than the diameter of said lamps.

12. A holder for a string of electric lights as set forth in claim 10 including connector means by which two or more of said holders may be connected side by side.

13. A holder for a string of electric lights as set forth in claim 12 in which the slots along each side of said upper and lower mounting plates are transversely opposed with the tabs along the opposite side of said upper and lower mounting plates so that when said two or more of said holders are connected side by side the upper and lower tabs of adjacent holders block the openings into the upper and lower slots of each other.

14. A holder for a string of electric lights as set forth in claim 12 in whcih said connector means comprises mutually corresponding cylindrical and tubular members for transverse disposition at opposite ends of said upper and lower mounting plates, one of said cylindrical and tubular members affixed to said plates and the other of said cylindrical and tubular members being mutually engageable therewith.

* * * * *